United States Patent [19]

Allen

[11] Patent Number: 5,525,155
[45] Date of Patent: Jun. 11, 1996

[54] SUPERPLASTICIZER-CONCRETE COMPOSITION AND METHOD OF PREPARATION

[75] Inventor: William C. Allen, Pasadena, Calif.

[73] Assignee: Union Oil Company of California, El Segundo, Calif.

[21] Appl. No.: 238,682

[22] Filed: May 5, 1994

[51] Int. Cl.⁶ .......................... C04B 24/16; C04B 24/00
[52] U.S. Cl. ...................... 106/802; 106/696; 106/724; 106/725; 106/726; 106/809; 106/816; 106/823; 264/311; 427/181; 427/183; 138/145
[58] Field of Search ................................. 106/696, 724, 106/737, 802, 816, 823, 738, 725, 726, 809; 264/311; 427/181, 183; 425/90; 138/145

[56] References Cited

U.S. PATENT DOCUMENTS

| | | | |
|---|---|---|---|
| 4,069,870 | 1/1978 | Gallus | 166/293 |
| 4,114,692 | 9/1978 | Gallus | 166/293 |
| 4,144,077 | 3/1979 | Gallus | 106/97 |
| 4,256,499 | 3/1981 | Terrel | 106/70 |
| 4,298,634 | 11/1981 | Phelps | 427/183 |
| 4,398,960 | 8/1983 | Murray | 106/738 |
| 4,588,443 | 5/1986 | Bache | 106/97 |
| 4,830,994 | 5/1989 | Schuetz | 501/127 |
| 4,950,552 | 8/1990 | Amend et al. | 428/626 |
| 4,979,992 | 12/1990 | Bache | 106/644 |
| 5,122,554 | 6/1992 | Allen | 524/8 |
| 5,151,126 | 9/1992 | Ranc et al. | 106/719 |
| 5,163,715 | 11/1992 | Rickard et al. | 285/55 |
| 5,176,752 | 1/1993 | Scheiner | 106/737 |
| 5,209,603 | 5/1993 | Morgan | 405/52 |
| 5,236,231 | 8/1993 | Allen et al. | 285/55 |
| 5,240,293 | 8/1993 | Allen et al. | 285/55 |
| 5,276,074 | 1/1994 | Allen | 524/8 |

FOREIGN PATENT DOCUMENTS 570199  3/1993  Japan.

OTHER PUBLICATIONS

Kosmatka et al. "Design & Control of Concrete Mixtures," Thirteenth edition, PCA, 1988, p. 18. No month.
Cement and Concrete Research, vol. 16, pp. 931–940, (1986). U.S.A., Pergamon Journals, Ltd. No month.
Kalajian, et al., "Oil Ash Stabilization Using Phosphogypsum," pp. 209–213. (Date unknown).
Cement and Concrete Research, vol. 22, pp. 725–735, (1992), U.S.A., Pergamon Press, Ltd. No month.
Artuo Ruio Renato Turriziani, "The Affect of Superplasticizing Agents on the Penetration of Aggressive Ions Into Cement Concretes and on Their Resistance to Attack by Aggressive Solutions," pp. 171–182. (Date unknown).

*Primary Examiner*—Mark L. Bell
*Assistant Examiner*—Michael Marcheschi
*Attorney, Agent, or Firm*—Gregory F. Wirzbicki; Alan H. Thompson

[57] ABSTRACT

A concrete pipe liner is formed from a difficult-to-compact hydraulic cement slurry applied to a pipe interior. The slurry contains inorganic non-compactible hydraulic cement particles, a concrete superplasticizer component, water, and optionally and preferably filler particles. The pipe is then spun to centrifugally cast a stronger, denser pipe liner than a comparable liner containing no superplasticizer.

58 Claims, No Drawings

SUPERPLASTICIZER-CONCRETE COMPOSITION AND METHOD OF PREPARATION

FIELD OF THE INVENTION

This invention relates to a method for preparing cementitious compositions. More specifically, the invention is related to compositions of hydraulic cements used as linings for the interiors of piping systems which handle harsh, high temperature fluids, e.g., geothermal brines.

BACKGROUND OF THE INVENTION

Many piping system applications in chemical and natural resource recovery industries involve the handling of corrosive, erosive, scaling or otherwise harsh aqueous fluids. One economic approach to handling these difficult fluids is to spin cast a fluid-resistant liner onto the interior surface of a low cost, non-fluid-resistant pipe. The pipe material, such as low carbon steel, provides structural support for the costlier and/or structurally inadequate liner. One type of fluid-resistant liner contains an inorganic cementitious material, such as a Portland-like cement.

Common lining material precursors contain a variety of inorganic fillers and cementing agents, and form a hydraulic slurry when mixed with water. The hydraulic slurry, which can temporarily flow like a liquid, is applied to the interior surface of the pipe and allowed to cure (slowly hydrate or precipitate) into a rigid pipe liner. Some hydraulic (water-based) cements (e.g., Portland cement), and liners made therefrom, are subject to chemical (e.g., corrosion) and mechanical (e.g., erosive) attack by certain harsh aqueous fluids, such as geothermal brines.

The primary objectives when creating new material components which can be used to fabricate a protective pipe liner are that the components: 1) produce a workable slurry which can be applied to the pipe interior; 2) harden into a liner which desirably attaches to and moves with the pipe; 3) resist long term fluid chemical and mechanical attack; and 4) provide an effective barrier to chemical attack of the underlying piping. The lined pipe should also be rugged, safe, reliable, environmentally acceptable, and cost effective.

A common problem with current concrete liner compositions is their propensity to crack. Geothermal applications can subject the liners to severe conditions resulting from differential thermal expansion (including that induced by thermal shock), vibration, and fluid flow. These conditions tend to crack brittle materials or liners, particularly those experiencing tensile stresses. Many such materials are noted to shrink upon setting or curing. Such shrinkage increases the tensile stress within the liner; thus, cracking may even occur during preparation. Cracks in the liner allow chemical attack of the underlying steel pipe. An expansive or non-shrinking cement may be employed as a lining material to maintain size and/or to generate compressive stress within the material in order to offset or circumvent shrinkage. Often such cements may not compact well.

Additives are being sought to improve the compactibility of the solid slurry components, hence densifying the resulting lining material, and to reduce shrinkage, thereby increasing the materials resistance to cracking.

SUMMARY OF THE INVENTION

The invention is particularly related to a method for preparing centrifugally spun, hydraulic cement-containing pipe liners useful for protecting pipe from geothermal fluid causing deterioration. Although concrete plasticizing or superplasticizing additives (i.e., superplasticizers) have been previously employed during the preparation of hydraulic cement concretes to reduce a desired water-to-cement ratio, in the method of this invention a concrete liner is prepared by mixing liberal quantities of water with an aggregate component (containing cement and normally fillers) and a superplasticizer to produce a slurry whose aggregate component can be readily settled under an elevated gravitational force, i.e., a G-Force greater than 1. Due to the presence of the superplasticizer, the solid particles of an otherwise difficult-to-compact slurry can be more readily compacted under a reduced G-Force (or for a shorter duration of time at the same G-Force) when compared to that having essentially the same composition, but lacking a superplasticizer. The compacted solid slurry particles have a smaller volume than the volume of a comparably prepared sample of compacted particles lacking superplasticizer. Thus, the addition of a relatively small amount of active superplasticizer component to a hydraulic cement/silicious filler mixture (usually at least 0.01 weight percent) enhances the compactibility of the cement and filler particles during centrifugal spinning to cast or form the liner—as compared to the compactibility of the cement and filler particles in a comparable slurry devoid of superplasticizer. Hence, due to an enhancement in the settling efficiency of the solid particles in the presence of superplasticizer, the method of the invention densifies the pre-set resultant spun cementitious material. Furthermore, the cured and hardened cementitious liner containing superplasticizer is not only more compact than its counterpart without superplasticizer, but has enhanced compressive strength.

The invention encompasses a solid barrier material prepared from highly compacted slurry solids. The solid barrier composition is the reaction product of a hydraulic cement, filler and water in the presence of a superplasticizer. The solid barrier composition is prepared by removing water from a slurry containing solid cement particles and superplasticizer by artificial settling techniques (e.g., centrifugal casting, vibratory casting, combinations thereof, etc.) and then allowing the resultant settled solids to set and cure in the presence of water. The slurry, without superplasticizer, can be highly thixotropic and/or relatively non-compactible. A concrete superplasticizer is used to mitigate these properties during casting. A useful concrete superplasticizer contains components such as a sodium salt of sulfonated polymeric naphthalenes and melamines or lignosulfonates, with melamines, and blends thereof, being highly preferred. These superplasticizers, when used in commercial form, may be used in quantities up to about 10 weight percent of the dry cement content.

In a preferred embodiment, no additional ultrafine particles (cementitious or non-cementitious particles of size less than about 0.5 micron) are mixed with the hydraulic cement/silicious filler mixture during preparation of the dry mix or water-containing slurry. The solid slurry particles, as well as the resultant compacted material derived from the solid slurry particles, contain essentially all particles of average cross-sectional dimension of at least about 1 micron (as measured by, for example, a Coulter counter), and typically exclude distributions identified with ultrafine particles. Alternatively, the slurry or the resultant compacted material containing solid slurry particles derived therefrom consists essentially of an ordinary hydraulic cement and filler material, water and the presence of a superplasticizer, and is essentially free of additional or supplementary amounts (distributions) of ultrafine cement or ultrafine filler particles.

Due to the superplasticizer, the enhanced compactibility of the slurry solids, or the solids of the resultant spun composition, provides an increased compressive strength for the cured (or partially cured) lining material. In some instances, the increase in compressive strength is dramatic—on the order of 300 percent or more following 7 days of cure compared to similar materials prepared without superplasticizer.

The compositions of the present invention produce acceptable preliner strengths for use in harsh geothermal operating conditions, achieving this result without a significant loss in broad spectrum chemical resistance. The liners made from such compositions can be expected to be tolerant of harsh conditions, reliable, safe, and cost effective. Also, the processing, handling, chemical resistance, and overall performance of lined pipe prepared by the invention can be further improved by the control of aggregate gradation and shape (round, angular, elongated, etc.), the use of pozzolanic aggregate materials and by the use of cements such as Portland, high alumina, and expansive or non-shrinking types.

DETAILED DESCRIPTION OF THE INVENTION

The present invention relates to a two component mixture used to form a hardened cementitious solid or concrete fluid barrier. The mixture contains (1) solid particles (or aggregate component) containing a dry hydraulic cement, and optionally a filler material, and (2) a liquid component containing a superplasticizer and water. The slurry mixture is a precursor composition particularly useful to mold and form a concrete lining preferably bonded to a substrate (i.e., a carbon steel pipe).

In the method of the invention, the two components are mixed without the addition of supplemental amounts of ultrafine cement or filler particles, transferred to a substrate, such as a pipe interior, and artificially settled, such as by centrifugal spinning or vibratory compaction, to shape the compacted solid material. The settling (spinning) may be temporarily halted to drain excess liquid. The superplasticizer is typically added to relatively difficult-to-compact slurries to transform them into relatively easy-to-compact slurries. The solid particles contained in such easy-to-compact slurries (containing superplasticizer) are readily settled to produce a shaped, pre-set (or pre-cured) compacted solid material which is denser than its counterpart lacking superplasticizer.

The shaped compacted material (i.e., resultant compacted solids composition) can be cured at ambient or elevated temperatures to form a hardened solid barrier (liner) that usually functions as an insulator. The resulting dense liners have enhanced compressive strength and are useful in transporting difficult-to-handle fluids, such as geothermal fluids, aqueous waste streams, and fluids from boiler blowdown, brine processing, or salt water heating/cooling.

The liquid component of the slurry composition contains a combination of a superplasticizer and water. The liquid component contains water in a concentration generally greater than 80.0, and in some cases greater than 90.0 percent by weight. The superplasticizer may be dispersed in the water by any of several means, such as (but not limited to) miscible mixing, dissolution or solubilization, emulsification, suspension, and the like. A dissolved active superplasticizer component is preferred. Generally the concentration of superplasticizer contained in the liquid component is dependent upon the weight percentage of the difficult-to-settle solid particles contained in the slurry composition. Ordinarily relatively small proportions of superplasticizer, compared to the solid particles (e.g., cement), are necessary. The slurry, the resultant compacted composition, and ultimately the hardened and cured product composition, contain at least 0.01, and normally at least 0.05 up to about 20 weight percent of active superplasticizer compound(s), calculated relative to the weight of dry cement. Preferably about 0.2 to about 5, and often less than 3 weight percent of active superplasticizer compound is combined with the cement. It is highly preferred that the active superplasticizer compound contain less than about 2 weight percent of the dry cement. In terms of addition of commercial concrete superplasticizer additives (wherein about 30–60 weight percent of the additive comprises active superplasticizer compound), it is preferred that greater than about 0.01, and usually about 1, to less than 8 weight percent of ordinary concrete superplasticizer be added to the aggregate, and it is highly preferred that about 1 to about 4 weight percent be added.

The superplasticizer is usually a concrete superplasticizer containing at least one polymeric component or condensate selected from the group consisting of naphthalenes, melamines, sulfonated naphthalenes and melamines, and ligonsulfonates, in the form of salts, polymeric salts, and other water-soluble or water-dispersible forms. Preferred active superplasticizer components include an alkali or alkaline earth metal salt of a highly condensed naphthalene or melamine sulphonic (or sulphonylic) acid/formaldehyde condensate. Highly preferred superplasticizer components are available from the Sika Corporation under such trade names as "Sikament FF"—containing a melamine polymer sodium salt prepared with sulfonic acid, "Sikament 86"—containing a melamine polymer sodium salt prepared with sulfonylic acid, and "Sikament 300"—containing a mixture of sulfonated naphthalene and melamine polymers. The most highly preferred superplasticizers contain polymeric melamines. Other available superplasticizers for use in the invention include organic admixtures containing polyhydroxy-, and polyhydrocarboxylic acid groups such as salts of polymers of ethylenically polymerizable carboxylic acids, and the like. Others include arylsulfonic acid-formaldehyde condensate salts.

Typically, the liquid component of the slurry composition contains free water (i.e., water that is available to react with the aggregate mixture). The amount of free water in the mixture of aggregate and liquid is unrestricted; however, if less than the amount required to fully react with (e.g., hydrate) the cement and filler is present, sufficient water must be supplied during cure to fully hydrate the reactants.

Normally when the cement is contacted by the superplasticizer, the cement is also in contact with sufficient amounts of free water to fully harden the cement into a solid/binding material during fabrication of the lined pipe. The superplasticizer is usually homogenously dispersed in the water prior to contact with the cement, filler, or combinations thereof.

The aggregate mixture typically includes an inorganic cement blend (e.g., Portland cement) and an inorganic filler (e.g., particles of a silicious material). However, the aggregate mixture can contain essentially all inorganic cement. The critical ingredient of the aggregate component is the dry hydraulic cement (i.e., a material which forms a slurry or paste when mixed with water and hardens into a solid or acts as a binding material). Cements are typically inorganic solids which hydrate or form precipitates after exposure to water.

A preferred dry inorganic cement is Portland cement. Portland cement contains CaO as one of the primary oxide components. Other significant oxide components include CaO, $SiO_2$ and $Al_2O_3$, with other inorganic compounds and/or metal oxides, such as Fe, Mg, K, S, Na, Ti, and Mn oxide being optionally present in smaller quantities. A compositional range reported in weight percent of the chief oxide components of Portland cement is as follows: Calcium Oxide (CaO) 60–67, Silica ($SiO_2$) 17–25, Alumina ($Al_2O_3$) 3–8, Iron Oxide ($Fe_2O_3$) 0.5–6, Magnesia (MgO) 0.1–4, Sulphur Trioxide ($SO_3$) 1–3, and Soda and/or Potash ($Na_2O+K_2O$) 0.5–1.3. The dry powder form of the cements used in the invention have a distribution of particles having a size (i.e., an average cross-sectional dimension) generally less than 100 microns (measured by conventional methods such as by a Coulter counter). Preferably, the particles are of average cross-sectional dimension at least 1 micron (by Coulter counter), and usually are less than about 75 microns, and preferably less than about 50 microns. Preferred cement particle distributions have at least 50 percent of the particle sizes in the range from about 5 to about 45 microns. (Cements and other aggregate components containing "essentially all" particles having average cross-sectional dimensions of at least 1 micron are known herein to contain greater than 98 volume percent of the particle distribution in particles of average cross-sectional dimension of at least 1 micron.)

The influence of superplasticizers in the invention is especially related to aggregate mixtures that, when combined with water, form difficult-to-compact slurries. A difficult-to-compact cement contained in a neat cement slurry (i.e., a slurry containing cement and water) is herein referred to as a "non-compactible hydraulic cement," i.e., a hydraulic cement whose total solid particles when thoroughly mixed with 38 weight percent water to form a degassed cement slurry devoid of superplasticizer and allowed to settle prior to set under an ordinary gravitational force (i.e., about a G-Force of 1), do not settle to the extent that they occupy a volume less than 90 volume percent of the original, degassed cement slurry volume.

One example of a non-compactible cement useful in the invention is an expansive cement or non-shrinking cement (i.e., a cement which expands upon cure or does not undergo a net volume reduction following set while curing). Such a cement or cement/filler mixtures usually require larger amounts of water to overcome thixotropic properties than the amounts found when using the typical Type I-IV and Type-G conventional cements. An example of a non-shrinking cement is a magnesium oxide cement, a Plastic Porcelain No. 30, supplied by Sauereisen Cements Co., Pittsburgh, Pa. A more preferred expansive cement employed in the invention is a type-K or type-K-like blend cement. Other expansive cements are of Type M and S. Cement mixes which also contain fine silica ($SiO_2$), such as Hi—Sil (TM) or other silicon-based compositions such as Fly Ash, Cab—O—Sil (TM) and Silica Lite (TM), also pose compactibility problems where a superplasticizer is useful. Non-shrinking cements may also be mixed with other shrinking cements to form an acceptable liner. Such expansive cements preferably have particle size distributions wherein essentially all the particulates have an average cross-sectional dimension of at least 1 micron.

In another embodiment, a more chemically resistant cement (acid and/or base resistant) can be employed. The resistant cement, such as a calcium-aluminate (i.e., high alumina) cement, is used in place of expansive Portland-like cements, or mixed therewith. The $Al_2O_3$ content of high alumina cements (i.e., at least 35 percent by weight of the cement) exceeds that found in Portland cements. Although high alumina cement has been used to form hydraulic cement concretes which are more resistant to brines and attack by carbon dioxide (a component of many geothermal fluids), other undesirable properties have made these hydraulic cements less satisfactory for geothermal service. Nevertheless, superior geothermal service properties for concrete compositions which include a high alumina cement may be employed in this invention. The minimum and maximum amounts of high alumina cement used in the invention are essentially equal to the amounts previously disclosed for Portland cement. Typically, the particle size diameters of such cements range from 1 to about 12 microns.

Other types of cements which are normally reacted with sufficient amounts of water to form a bonding matrix are also acceptable. This includes other silicate-based cements and cements which contain organic materials, such as plastic containing cement. Combinations of different cements are also possible.

Although a liner can be formed using only cement (i.e., containing 100 percent cement and no filler), liner properties are typically more desirable if both a non-cementitious filler and cement are the components of the aggregate mix. Although only a trace amount of cement in the aggregate component is required, the quantity of cement needed is a function of the cement type and/or filler type, overall composition, processing parameters, and/or application. When the two components (i.e., liquid and solid components) are mixed and the resultant material centrifugally spun to form a pipe liner, the optimum ratio of cement to inorganic filler is controlled to a large extent by the spinning process. The proportion of cement (i.e., Portland or Portland-containing additive, as for example, Type-K) ranges from between 5 and 100 percent by weight of the total aggregate component, with the proportion of cement usually ranges between 20 and 90 percent by weight of the total aggregate component. Preferred dry compositions contain at least 50, and usually above 50 to about 80 percent by weight of cement in the aggregate component.

The superplasticizers also enhance the compaction of difficult-to-compact cement/filler mixtures, i.e., slurries containing cement, water and filler. A difficult-to-compact cement/filler mixture is herein referred to as a "non-compactible hydraulic cement/filler slurry." i.e., an aqueous-solids mixture containing total solid particles comprising 70 weight percent of cement, with the balance being other solids of a cementitious and/or non-cementitious nature having an average cross-sectional dimension of at least 1 micron, that when thoroughly mixed with water comprising 38 weight percent of the degassed, resultant slurry devoid of superplasticizer and allowed to settle prior to set under an ordinary gravitational force (i.e., about a G-Force of 1), do not settle to the extent that they occupy a volume which is less than 90 volume percent of the original, degassed cementitious slurry volume.

A non-cementitious filler encompasses the major remaining component of the aggregate mixture in the preferred embodiment. The typically inorganic (i.e., silicious) sand-like filler may contain sand, crushed quartz or granite particles, and mixtures thereof. Ordinarily such filler particles are crystalline and are contained in a continuous distribution of sizes. The filler particles and the cement particles can be of sizes within the same order of magnitude; however, the filler materials preferably have distributions wherein essentially all particles have an average cross-sectional dimension of at least 1 micron and are normally at least as large in size as the cement particles. The filler particles preferably include powder-like materials such as a silica flour—a non-cementitious material containing more than 90 weight percent of $SiO_2$. In one highly preferred embodiment the filler consists essentially of silica flour. Although not required, the filler (such as sand and/or a silica flour) preferably encompasses between 50 and 90 percent by weight of the dry aggregate mixture. In some high cement applications, the filler comprises from about 10 to less than 50 percent, and usually less than 35 percent, by weight of the dry aggregate mixture.

In another alternative embodiment, pozzolanic materials/particles are used in the aggregate mixture. The pozzolanic materials include fly ash (i.e., inorganic residue after organic materials have been oxidized), processed shale (i.e., residue after organic materials have been removed), crushed brick, and geothermal sludges/brine precipitates. These pozzolanic particles may be acid washed prior to use in the concrete. A preferred pozzolanic material is fly ash available from Haliburton Corporation having a particle size distribution from about 5 to about 500 micron average cross-sectional dimension (median about 50).

Particle sizes of the aggregate (cement and filler particles) mixture are gradated in a preferred embodiment to form a smooth top or inner surface of a pipe liner. The filler can include the powder-like silica flour, defined herein as a silicious material having a distribution of particle sizes of average cross-sectional dimension from at least 1 to less than 100 microns. It is preferred that essentially all silica flour particles are of average dimension of at least 0.8, and preferably at least 1 micron. Examples of preferred silica flour particle distributions include Cab—O—Sil (TM) available from Cabot Corporation, Tuscola, Ill., containing particle sizes ranging from about 6 to about 80 microns (median about 25); ImSil A108 (TM) from Unimin of Elco, Ill., ranging from about 0.8 to about 10 microns (median about 4); Hi—Sil (TM) from PPG Industries, Inc., Pittsburgh, Pa., ranging from about 2 to about 30 microns (median about 7); Silica Like (TM) from Haliburton, ranging from about 2 to about 80 microns (median about 17); and a highly preferred material—silica flour from Haliburton ranging from about 2 to about 100 microns (median about 26). The proportion of silica flour, as a weight percent of the aggregate component, ranges up to about 85 percent, but preferably from 5 to 45 percent.

Using a gradated filler (i.e., a distribution of filler particle sizes) minimizes the tendency to form an overly thick skin (i.e., a layer of the smaller sized particles of the distribution) or surface layer when relatively large particles are present. An undesirable overly thick skin may contain an excessive amount of smaller sized particles as a result of the centrifugal casting process. The aggregate materials, having different sizes and densities, tend to segregate during agitation or centrifuging if not hindered in the process. The lighter, more easily suspended particles and liquids tend to concentrate at the top (or form a surface layer on the inside diameter of centrifuged liners), forming a smooth surface. Poorly gradated filler can result in an overly thick, crack-prone skin or inadequate substrate by depleting the quantity of fine filler material and cement in the main body of the liner. Use of specific gradated aggregates can result in a suitable surface (i.e., smooth skin surface) and help maximize elements by limiting excessive segregation tendencies. In the invention, the homogenously arranged presence of a superplasticizer compound with the cement and filler particles provides further improved compactibility for a specific gradated aggregate distribution compared to the same gradated aggregate distribution not containing the additive superplasticizer.

Control of the maximum size particle as well as the distribution of sizes (i.e. gradation) can be important in obtaining optimum results, especially for spun or centrifugally cast liners. The maximum particle size is a function of liner thickness, and consequently pipe diameter. The maximum particle size is generally less than about 2400 micron for common pipe and for liner sizes currently used in geothermal applications, preferably less than 1400 micron.

Controlling the weight ratio of the quantity of the filler particles in the aggregate to the quantity of the cement portion of the aggregate is a method for directly controlling cured liner properties. A range of cement:filler ratios from 1:4 (one part cement to four parts filler) to 20:1 (twenty parts cement to one part filler) produces liners having acceptable properties. A nominal weight ratio of at least one part cement to one part filler produces a preferred lining. A preferred range of cement:silica flour ratios is from 2:1 to 4:1 for Type-G cement, and 2:1 to 10:1 for Type-K cement. A maximum silica flour content of 50 percent by weight of total solids is a typical practical limit independent of the cement:silica flour ratio.

An alternative embodiment especially useful for hand trowelling applications includes fibrous and/or fibrous shaped fillers in the mixture. The fibers, or fiber bundles, generally contain inorganic materials, such as glass, Wallastonite ($CaO \cdot SiO_2$), and the like, but may also contain other materials, such as graphite. Although fibers of almost any length and diameter can be used, fiber lengths rarely exceed 0.6 cm (0.25 inch). Average fiber diameters typically range from 10 to 20 microns (0.0004 to 0.0008 inch). Average fiber lengths typically range from 0.3 to 0.4 cm (0.12 to 0.16 inch) and the most common aspect ratio (i.e., length to diameter) ranges from approximately 150 to 400.

For the purposes of this invention, it is intended that the term "fiber" or "fibrous filler" encompass materials which may have reactive or polar functional groups referred to as "filaments," which can vary in length. Illustrative functional groups which may react with chemicals in the liquid-aggregate mixture and are contained in suitable fibers are hydroxyl, ethereal, carbonyl, thiocarboxyl, carboxylate, thiocarboxylate, amido, amino, etc. Essentially all natural fibers include one or more polar functional groups. Illustrative are virgin and reclaimed cellulosic fibers such as cotton, wood fiber, coconut fiber, jute, hemp, etc., and protenaceous materials such as wool and other animal fur. Illustrative synthetic fibers containing polar functional groups are polyesters, polyamides, carboxylated styrene-butadiene polymers, etc. Illustrative polyamides include nylon-6, nylon 66, nylon 610, etc.; illustrative polyesters include "Dacron," "Fortrel," and "Kodel"; illustrative acrylic fibers include "Acrilan," "Orlon" and "Creslan." Illustrative modacrylic fibers include "Verel" and "Dynel." Illustrative of other useful fibers which have polar constituents are synthetic carbon (i.e., graphite), silicon, boron and magnesium silicate (e.g., asbestos) polymer fibers, and metallic fibers.

Although other components may be present in the solid or aggregate mixture, specifically limited or excluded is silica dust, i.e., inorganic particles having an average cross-sectional dimension (size) of less than about 0.5 micron. Significant quantities of ultrafine inorganic particles were previously cited (i.e., in U.S. Pat. No. 4,588,443) as important to the integrity of cement. Testing of material made from selected aggregate and specific liquid components hereinafter described, but excluding the ultrafine inorganic particles, has yielded highly compacted liners having high compressive strength. Liners produced from aggregate mixtures which contain essentially no particles of average cross-sectional dimension less than 0.5 micron can withstand harsh geothermal environments. However, incidental, insignificant amounts of particles of dimension less than 1 micron, i.e., less than two percent by volume of the solid component, may inadvertently be contained in a distribution due to abrasion, etc. Such incidental amounts are typically found in the tails of particle size distributions for commerciable available products.

In the method of the invention the two component mixture, as described above, is used for centrifugal casting applications. The first step is to mix the solid and liquid components to form a slurry. The mixing step can be accomplished by first pre-mixing the solids (i.e., commingling and breaking up agglomerates) and then adding and mixing the liquid component containing a superplasticizer to obtain a desired slurry consistency. Optionally, amorphous silica additives may be pre-blended with the dry mix. Also, fibers can be similarly blended or added later to the mixture.

Typically the liquid component is combined with the aggregate component in a liquid-to-total solids weight ratio greater than 0.5:1 to produce a slurry having a workable consistency. Usually the viscosity of the slurry is above about 100 centipoise, for example, a viscosity in the range from about 120 to about 135 centipoise measured at a shear rate of 200 rpms has provided suitable workability for a Type-K cement/silica flour mixture (70/30 weight ratio) combined with the liquid component containing superplasticizer. For a predetermined workable slurry consistency, usually the volume of superplasticizer decreases in the liquid component as the viscosity of the slurry increases. Alternatively, a given viscosity can be maintained by increasing the volume of superplasticizer in the liquid component and reducing the liquid-to-solids ratio in the slurry. For instance, in the above-described Type-K cement/silica flour mixture with liquid component, the 120–135 viscosity can be maintained with a liquids-to-solids ratio of about 0.65:1 when the superplasticizer concentration is nearly zero, i.e., 0.01 percent, whereas a ratio of about 0.5:1 achieves the desired viscosity as the superplasticizer concentration reaches about 4 percent by weight.

Following its formation, the slurry is transferred (and applied) to a substrate, such as a pipe interior. Conveyance may be accomplished by means such as pumping the liquid-like slurry, gravity flow of the slurry via troughs, moving via belt, and auger or portable trough conveyance.

The pipe and transferred slurry are then spun around the pipe's cylindrical axis to shape the material into a liner. Ordinarily the pipe is spun at the highest rates achievable, given the quality of pipe and the spinning equipment. Typically a 10" diameter pipe can be spun to 500–700 rpm without difficulty. The force exerted upon the slurry during spin casting distributes the slurry material over the interior pipe surface. Typically the force is greater than 10 G's, and usually from about 20 to about 50 G's. Dams or barriers are placed at the ends of the pipe sections to retain the solid particles in place prior to and during centrifuging. Due to the presence of the superplasticizer, the settled slurry solids are sufficiently compacted to produce a shaped liner having a smaller volume of solids than a similarly prepared liner lacking the superplasticizer.

In the final hardening step the liner is allowed to cure or set. The cure normally occurs at ambient temperature for a time sufficient to harden it for service in geothermal or other applications. Elevated temperature curing (i.e., steam curing) may be employed, and is preferred for some instances. Exposing the liner to aqueous fluids at elevated temperatures (e.g., geothermal fluids) may also result in further curing of the material or hydrothermal alteration. After the lined pipe is placed in service and the liner exposed to harsh aqueous fluids, a portion of the inorganic cement particles may further undergo hydrothermal alteration. Since significant hydration of the cement particles occurs during the initial hardening phase of the liner, a newly formed matrix may slowly overlay or replace the original matrix resulting from the initial hydration step. Initial or pre-service liner properties may therefore not be indicative of later service properties when a geothermal fluid is contacted with the liner.

The cement may also act as a neutralizer or buffering agent. As an acidic or a low pH aqueous fluid (i.e., geothermal fluid) permeates the concrete liner, the cement particles may neutralize or raise the pH of the permeating fluids. The neutralized fluid contacting the substrate carbon steel would be less likely to be corrosive. In an alternative embodiment, additional quantities of lime (calcium oxide)/hydrated lime may be added to the aggregate to increase this possible neutralizing property of the cement-containing composition.

Usually excess liquids are present during curing and/or spinning, and alternative process step(s) can be provided. These added steps split the spinning step, wherein the excess fluids not removed in the initial spin (usually water) are allowed to drain from the section after an initial spinning step. The section can then be re-spun to further minimize slumping, etc. In the initial spinning step, the liner is shaped and the aggregate compacted sufficiently to allow for the additional drainage of excess fluids. In the re-spinning step, the liner is further compacted and in some special instances allowed to harden to the extent that slumping is precluded.

Unless a release compound or separation material is placed at the liner/pipe interface, the hardened and cured liner is generally bonded mechanically (or chemically) to some degree (i.e., adheres) to the pipe after the casting process. In an alternative embodiment, a release compound may be applied to the steel piping or fitting (now serving as a form) to create a separate concrete pipe/fitting having an outer diameter equal to the inside diameter of the pipe/fitting form. In modified embodiments, partial bonding of the liner to the pipe or pipe sections, connectors or fittings may allow some relative motion (e.g., resulting from differential thermal expansion) of the liner with respect to the pipe/fitting. The pipe/fitting can also be pre-treated with a coupling agent or mechanical bonding system (e.g., a welded screen) to facilitate bonding to the liner.

Still other alternative embodiments are possible. These include: a plurality of liner segments within a single pipe section separated by elastomeric or plastic seals; extending the liner beyond the end of the pipe section to interconnect with tanks or other equipment; having the outer pipe contain other materials, such as other structural metals, ceramics, and compositions made from thermoset or thermocured plastics, reinforced or otherwise.

The invention satisfies the need to provide a low cost, easy to apply liner to steel pipe for use in harsh geothermal or other environments. The dry cement and other aggregate are relatively non-toxic. Ultrafine aggregate particles (i.e., silica dust) have been limited or excluded from the mixture. The mixture hardens to provide a strong, highly compacted, hydrothermally stable liner.

The invention is further illustrated by the following examples which are illustrative of specific modes of practicing the invention and are not intended as limiting the scope of the invention in any manner as defined by the appended claims.

EXAMPLE 1

Aggregate mixtures (i.e., solid component) and a liquid mixture containing varying concentrations of a highly sulfonated melamine salt contained in a commercial concrete superplasticizer are prepared and mixed to form a slurry. The solid component composition of Type-K cement and silica flour, i.e., KCSF, is described in Table 1 as follows:

TABLE 1

| AGGREGATE MIXTURE-EXAMPLE 1 | |
|---|---|
| Component | Aggregate weight % |
| Silica Flour, from Haliburton (>1 <7.5 micron average dimensional size) | 28.56 |
| Portland Cement, Type-K | 71.44 |

Six separate portions of the liquid component, designated as I, II, III, IV, V and VI, are prepared with water and contain varying concentrations of a superplasticizer having the trade name "Sikament 86," ranging from 0, 0.5, 1.0, 2.0, 4.0 and 8.0 weight percent, respectively, based on the weight percent of the Type-K Portland cement contained in the dry mix. The amount of water in the liquid component in the mixture varies so as to provide an initial slurry composition of constant viscosity for the centrifugally cast liner specimens. Curing includes keeping the samples in contact with water following casting to fully hydrate the class K Portland cement. The liquid components, I–VI, inclusive, are individually added to separate portions of aggregate components designated in Table 1, to form the corresponding slurry compositions I–VI, inclusive. The average ambient temperature is approximately 24° C. (75° F.). The slurry compositions are placed into a casting fixture and the solids compacted 15 minutes at an average G-Force of 44.6G's to form Samples I–VI, inclusive.

The samples are tested for compaction and the data summarized in Table 2 as follows:

TABLE 2

| Sample No. | (Wt. % Sikament 86 Relative to Type-K Cement content) | % Compaction of KCSF (Scaled to KCSF Standard*) |
|---|---|---|
| I | (0) Control | 14 |
| II | (0.5) | 18 |
| III | (1.0) | 22 |
| IV | (2.0) | 30 |
| V | (4.0) | 33.5 |
| VI | (8.0) | 34.0 |

*KCSF standard - The extent of compaction is determined by assuming that the maximum value obtainable is one based upon a weighted grain density of the particles of concern (e.g., based primarily upon cement and silica flour at 3.15 and 2.657 gm/cc respectively) had the solids mix been compressed to a state of zero porosity. [An insignificant uncertainty factor exists for a slurry due to the partial solubility and/or hydration of the constituents. Regardless, samples are prepared wherein following centrifugal casting the volume associated with the extent of settling (i.e., the volume of the supernatant liquid) is measured and reported as a percent of the slurry volume containing the solids minus that of an ideally compacted dry mix volume assuming an absence of porosity. In order to scale the results to compaction values realized in KCSF systems for comparative purposes, the volume of fluids to solids ratio is adjusted artificially for KCSF systems to reflect that ratio representative of a KCSF reference slurry (i.e., slurry without superplasticizer).]

Table 2 indicates that compaction of the aggregate above 14% (of the KCSF standard) is affected by the presence of Sikament 86 (containing a superplasticizer made from an alkaline salt of a sulfonated melamine polymer). The data indicate that at a specific aggregate distribution and given an initial constant viscosity the superplasticizer influence on compaction of the aggregate is essentially constant above about 4 weight percent of the commercial superplasticizer additive, relative to the dry cement weight. The effect of the superplasticizer is particularly dramatic between 0 and about 3 weight percent relative to the dry cement. The reduced slurry fluids are more easily removed by centrifugal casting in the presence of compaction-improving amounts of superplasticizer.

EXAMPLE 2

The effects of slurry solids compactions can be observed by comparing the compressive strength of 7 mm (in length)×9 mm (in diameter) sample plugs of lining materials prepared in a similar manner as in Example 1, but using a constant fluid content as opposed to maintaining a constant fluid viscosity.

Slurries C and M, are prepared at a constant fluid content and contain 0 and 8 weight percents of a commercial concrete superplasticizer having the trade name "Sikament 300." Five separate samples representing liner C and five separate samples representing liner M, were prepared from slurries C and M, respectively, and spun at a mean G-Force of 44.6G. The samples undergo a 7-day wet cure and are cured as described above for a measurement of their wet compressive strength (p.s.i.) as summarized in Table 3:

TABLE 3

| | Wet Compressive Strength (p.s.i.) 7-day cure | |
|---|---|---|
| G-Force | Liner C | Liner M |
| 37 | 1,800 | 1,000 |
| 41 | 2,000 | 3,400 |
| 44 | 2,600 | 4,800 |
| 47 | 2,900 | 5,400 |
| 53 | 2,500 | 7,100 |

The data in Table 3 indicate that the effect of the superplasticizer on compressive strength is considerable. The increase in G-Force from 37G to 53G, is indicative of the location of the plug taken from the sample. The compressive strength, in addition to such G-Force influence, is heavily influenced by the ease of its compaction. Liners prepared by the invention (Liners M) exhibit large variations in their 7-day wet compressive strength, ranging in this example from 1,000 p.s.i. to 7,100 p.s.i., i.e., up to about a factor of 7, whereas the control materials (Liner C) only increase (given similar G-Forces and amount of overlying aggregate) by a factor of up to less than 2. This effect is surprising, particularly in light of the fact that the K-type cement/silica flour mixture contains no additional or supplemental ultrafine particles.

The effects of the addition of plasticizer to the cement/silica flour mixture indicate, for instance, that the preparer of the liner is able to spin liners having equivalent average compressive strengths at considerably lower G-Forces in the presence of superplasticizer. Further, the preparer of the liner can achieve maximum compressive strengths, e.g., at least 200 percent higher, when superplasticizer is added to the slurry, even though strengths vary dramatically throughout the material.

While particular embodiments of the invention have been described, it will be understood, of course, that the invention is not limited thereto since many obvious modifications can be made, and it is intended to include within this invention any such modifications as will fall within the scope of the invention as defined by the appended claims.

What is claimed is:

1. A method for preparing a hydraulic cementitious composition, said method comprising:

mixing solid particles comprising greater than 50 dry weight percent of hydraulic cement with a superplasticizer and water to form a slurry and wherein said solid particles consist essentially of particles of cross-sectional dimension greater than 1 micron; and settling said solid particles contained in said slurry under a G-Force greater than 1 to produce a resultant compacted composition of said solid particles containing sufficient water to fully hydrate said cement.

2. The method defined in claim 1 further comprising curing said resultant compacted composition to produce a hardened cementitious composition having a smaller volume than the volume of a comparably prepared hardened cementitious composition containing no superplasticizer or reaction products thereof.

3. The method defined in claim 1 wherein said hydraulic cement comprises a non-compactible hydraulic cement or said slurry comprises a non-compactible hydraulic cement/filler slurry when devoid of a superplasticizer.

4. The method defined in claim 2 wherein said hardened cementitious composition has a greater compressive strength than said comparably prepared hardened cementitious composition containing no superplasticizer or reaction product of said superplasticizer.

5. The method defined in claim 1 wherein said G-Force is greater than 10.

6. The method defined in claim 1 wherein said solid particles further comprise about 10 to less than 50 dry weight percent of non-cementitious filler particles.

7. The method defined in claim 3 wherein said solid particles further comprise about 10 to less than 50 dry weight percent of non-cementitious filler particles.

8. The method defined in claim 1 wherein said superplasticizer comprises at least one component selected from the group consisting of polymers and condensates of sulfonated naphthalenes, melamines and lignosulfonates.

9. The method defined in claim 1 wherein an active plasticizer compound contained in said superplasticizer comprises greater than 0.01 to about 5 weight percent of said dry hydraulic cement.

10. The method defined in claim 7 wherein said slurry comprises silica flour and is applied to the interior of a pipe duct and said settling comprises centrifugal spinning or vibratory compaction.

11. The method defined in claim 3 wherein said non-compactible hydraulic cement comprises a non-shrinking hydraulic cement or expansive hydraulic cement.

12. The method defined in claim 1 wherein said dry hydraulic cement comprises a Type K cement.

13. The method defined in claim 1 wherein solid particles comprise at least 50 weight percent of said dry hydraulic cement.

14. The method defined in claim 1 wherein said resultant compacted composition is denser than a comparably prepared resultant compacted composition containing no superplasticizer.

15. The method defined in claim 2 wherein said hardened cementitious composition is denser than said comparably prepared hardened cementitious composition containing no superplasticizer.

16. The method defined in claim 1 wherein said concrete superplasticizer comprises a polymeric sulfonated melamine component.

17. The method defined in claim 1 wherein said resultant compacted composition of said solid particles has a smaller volume than the volume of a comparably prepared resultant compacted composition containing no superplasticizer in said slurry.

18. A compacted composition prepared by the method of claim 1 comprising non-compactible hydraulic cement, water and superplasticizer.

19. A cured cementitious solid composition prepared from the compacted composition of claim 18 comprising about 0.4 to about 4 weight percent of an active superplasticizer compound.

20. A method for enhancing the compactibility of a cement-containing composition, said method comprising:

(1) mixing a solid component and a liquid component to form an aqueous hydraulic cement slurry, said solid component comprising (a) greater than 50 dry weight percent of a hydraulic cement consisting essentially of particles of average cross-sectional dimension of at least about 1 micron, and (b) a filler material consisting essentially of particles of average cross-sectional dimension at least about 1 micron, said liquid component comprising water and a superplasticizer;

(2) applying said aqueous hydraulic cement slurry to the interior surface of a substrate capable of being rotated about at least one axis; and (3) centrifugally spinning said solid component of the applied slurry of (2) at a G-Force greater than 1.0 to form a cement-containing liner for said substrate, said liner containing sufficient water to fully hydrate said cement.

21. The method defined in claim 20 wherein said substrate comprises a pipe, and said solid components spun in step (3) form a resultant compacted composition having a smaller volume than a comparably prepared resultant compacted composition containing no superplasticizer.

22. The method defined in claim 21 wherein said filler material comprises a distribution of particles of average cross-sectional dimension larger than that of said particles of said hydraulic cement.

23. The method defined in claim 21 wherein said step (3) comprises centrifugally spinning said pipe for a shorter time than centrifugally spinning at the same G-Force a comparable pipe containing said aqueous hydraulic cement slurry of step (2) containing no superplasticizer.

24. The method defined in claim 21 wherein said step (3) comprises compacting said solid components at a lower G-Force than comparable solid components containing no superplasticizer.

25. The method defined in claim 20 wherein said superplasticizer comprises greater than 0.01 to less than 5 weight percent of said dry hydraulic cement and step (3) further comprising draining water from said solid components.

26. The method defined in claim 20 wherein said solid component comprises at least 50 weight percent of a non-compactible hydraulic cement.

27. The method defined in claim 21 wherein said dry hydraulic cement comprises a Type K cement and said filler material comprises silica flour.

28. The method defined in claim 20 wherein said filler material consists essentially of silica flour.

29. A compacted cementitious composition prepared by the method of claim 20 comprising a superplasticizer, water, and a solid component consisting essentially of particles of average cross-sectional dimension at least about 1 micron.

30. A cured cementitious solid composition prepared from the compacted cementitions composition of claim 29 comprising about 0.01 to about 20 weight percent of said superplasticizer, calculated relative to said hydraulic cement.

31. A method for producing a solid element protecting an interior surface of a duct from an aqueous fluid contained within said duct, said solid element produced from a mixture of a solid component and a liquid component, said solid component containing at least 50 weight percent of particles of an inorganic Type-K cement and further containing particles of an inorganic filler comprising silica flour wherein said particles of said cement and said filler consist essentially of particles of average cross-sectional dimension greater than 1 micron, and said liquid component containing water and a superplasticizer compound, said method comprising the following steps:

(1) mixing of said liquid component and said solid components at ambient temperature;

(2) applying the mixed components from step (1) to said interior surface of said duct;

(3) centrifugally spinning said duct at an average G-Force greater than 10 to produce a resultant cementitious composition until said components have at least partially formed a semi-solid shape of said solid element; and (4) curing said resultant cementitious composition to produce a cured resultant cementitious composition containing sufficient water to fully hydrate said cement.

32. A cementitious composition prepared by the method of claim 31 comprising a Type-K cement, an inorganic filler comprising silica flour, water, and 0.01 to 5 weight percent of a superplasticizer compound, calculated relative to said Type-K cement.

33. A hydraulic cement slurry composition comprising (1) a solid component having greater than 50 dry weight percent of a non-compactible hydraulic cement and (2) sufficient water to fully hydrate said cement, and (3) at least one superplasticizer compound.

34. The composition defined in claim 33 further comprising about 10 to less than 50 dry weight percent of filler particles.

35. The composition defined in claim 33 wherein said non-compactible hydraulic cement comprises a hydraulic cement selected from the group consisting of non-shrinking hydraulic cement and expansive hydraulic cement.

36. The composition defined in claim 33 wherein said non-compactible hydraulic cement is a Portland cement or a high alumina cement.

37. The composition defined in claim 36 wherein said non-compactible hydraulic cement comprises a Type K cement.

38. The composition defined in claim 33 wherein said superplasticizer contains at least one salt component selected from the group consisting of polymers and condensates of sulfonated naphthalenes, melamines, and lignosulfonates.

39. The composition defined in claim 33 wherein said superplasticizer comprises a polymeric sulfonated melamine component.

40. The composition defined in claim 33 wherein said filler particles are selected from the group consisting of silica flour, sand, crushed quartz, crushed granite, fly ash, processed shale, crushed fired brick, geothermal sludges and geothermal brine precipitates.

41. The composition defined in claim 33 wherein said superplasticizer comprises about 0.01 to about 5 weight percent of said hydraulic cement.

42. A compacted cementitious composition comprising a compacted form of said slurry composition defined in claim 33.

43. A hardened duct liner comprising a cured compacted cementitious composition defined in claim 42.

44. A slurry composition comprising a non-compactible hydraulic cement/filler slurry comprising hydraulic cement particles, filler particles and sufficient water to fully hydrate said hydraulic cement particles, said composition further comprising at least one superplasticizer compound, wherein said hydraulic cement particles and said filler particles consist essentially of particles of average cross-sectional dimension at least about 1 micron and said hydraulic cement particles comprising greater than 50 dry weight percent of the total hydraulic cement and filler particles.

45. The composition defined in claim 44 wherein said hydraulic cement comprises an expansive cement or a non-shrinking cement.

46. The composition defined in claim 45 wherein said hydraulic cement comprises a Portland cement and said filler particles comprise silica flour.

47. The composition defined in claim 44 wherein said hydraulic cement comprises a Type K cement.

48. The composition defined in claim 44 wherein said hydraulic cement particles comprise particles of a non-compactible hydraulic cement.

49. The composition defined in claim 44 wherein said superplasticizer contains at least one salt component selected from the group consisting of polymers and condensates of sulfonated naphthalenes, sulfonated melamines, and lignosulfonates.

50. The composition defined in claim 44 wherein said superplasticizer comprises greater than 0.4 weight percent of said hydraulic cement.

51. The method defined in claim 44 wherein said filler particles consist essentially of silica flour.

52. A hardened duct liner comprising a cured cementitious composition of the slurry defined in claim 44 having a mean compressive strength greater than that of a hardened duct liner prepared without said superplasticizer.

53. A cementitious composition comprising:

(1) homogeneously arranged, fully hydrated cementitious inorganic solid particles, essentially all of which are of average cross-sectional dimension at least about 1 micron;

(2) densely packed non-cementitious solid particles, essentially all of which are of average cross-sectional dimension at least about 1 micron; and wherein said particles of (1) and a superplasticizer compound are homogeneously distributed in the volume between said particles of (2), and said particles of (1) comprise greater than 50 dry weight percent of the total solid particles of (1) and (2).

54. The composition defined in claim 53 wherein said superplasticizer comprises from 0.01 to 10 weight percent of said cementitious inorganic solid particles, calculated as moles of superplasticizer compound.

55. The composition defined in claim 53 wherein said particles of (1) comprise an expansive cement or a non-shrinking hydraulic cement.

56. The composition defined in claim 55 wherein said particles of (2) comprise silica flour.

57. The composition defined in claim 53 wherein said superplasticizer compound contains at least one component selected from the group consisting of polymers and condensates of sulfonated naphthalenes, sulfonated melamines, and lignosulfonates.

58. The composition defined in claim 34 wherein said non-compactible hydraulic cement, said water and said filler particles comprise a non-compactible hydraulic cement/filler slurry.

* * * * *